(12) United States Patent  
Wang

(10) Patent No.: US 11,190,098 B2
(45) Date of Patent: Nov. 30, 2021

(54) VOLTAGE BOOSTER CIRCUIT AND RELATED CIRCUIT, CHIP AND WEARABLE DEVICE

(71) Applicant: SHENZHEN GOODIX TECHNOLOGY CO., LTD., Guangdong (CN)

(72) Inventor: Wen-Chi Wang, Guangdong (CN)

(73) Assignee: SHENZHEN GOODIX TECHNOLOGY CO., LTD., Guangdong (CN)

(*) Notice: Subject to any disclaimer, the term of this patent is extended or adjusted under 35 U.S.C. 154(b) by 0 days.

(21) Appl. No.: 17/115,635

(22) Filed: Dec. 8, 2020

(65) Prior Publication Data

US 2021/0104947 A1 Apr. 8, 2021

Related U.S. Application Data

(63) Continuation of application No. PCT/CN2019/109900, filed on Oct. 8, 2019.

(51) Int. Cl.
*H02M 3/07* (2006.01)
*G05F 3/26* (2006.01)
(Continued)

(52) U.S. Cl.
CPC ............... *H02M 3/07* (2013.01); *G05F 3/26* (2013.01); *H02M 1/08* (2013.01); *H02M 3/156* (2013.01)

(58) Field of Classification Search
None
See application file for complete search history.

(56) References Cited

U.S. PATENT DOCUMENTS 5,877,948 A * 3/1999 Dijkmans ............... H02M 3/07
  363/60
8,598,854 B2 * 12/2013 Soenen .................... G05F 1/575
  323/274

(Continued)

FOREIGN PATENT DOCUMENTS

CN  1980025 A  6/2007
CN  101873064 A  10/2010
(Continued)

OTHER PUBLICATIONS

English Abstract of CN108322041A, No. Date.
(Continued)

*Primary Examiner* — Jeffery S Zweizig
(74) *Attorney, Agent, or Firm* — WPAT, P.C., Intellectual Property Attorneys; Anthony King

(57) ABSTRACT

The present application discloses a voltage booster circuit and a related circuit, chip and wearable device. The voltage booster circuit has an output terminal, which provides an output voltage and a load current. The voltage booster circuit includes: a first charge pump, which provides a first bias current; a second charge pump, which provides the load current; an output voltage fixing circuit, which draws the first bias current from the first charge pump to the output terminal, wherein the output voltage fixing circuit fixes a first charge pump voltage of the first charge pump by fixing the first bias current and further fixes the output voltage based on the fixed first charge pump voltage; and a load current generation circuit, which draws the load current from the second charge pump to the output terminal based on a second charge pump voltage of the second charge pump.

19 Claims, 6 Drawing Sheets

(51) Int. Cl.
*H02M 1/08* (2006.01)
*H02M 3/156* (2006.01)

(56) References Cited

U.S. PATENT DOCUMENTS

| | | | |
|---|---|---|---|
| 2008/0084720 | A1 | 4/2008 | Thiele et al. |
| 2008/0143307 | A1 | 6/2008 | Bassett et al. |
| 2009/0206916 | A1 | 8/2009 | Dreibelbis et al. |
| 2016/0291629 | A1 | 10/2016 | Yoshida et al. |
| 2018/0166984 | A1 | 6/2018 | McIntosh et al. |
| 2019/0123639 | A1 | 4/2019 | Daniel |

FOREIGN PATENT DOCUMENTS

| | | | |
|---|---|---|---|
| CN | 102043417 | A | 5/2011 |
| CN | 102047540 | A | 5/2011 |
| CN | 102201733 | A | 9/2011 |
| CN | 107968566 | A | 4/2018 |
| CN | 108306637 | A | 7/2018 |
| CN | 108322041 | A | 7/2018 |

OTHER PUBLICATIONS

English Abstract of Foreign Reference CN101873064A, No Date.
English Abstract of Foreign Reference CN102201733A, No Date.
English Abstract of Foreign Reference CN107968566A, No Date.
English Abstract of Foreign Reference CN108306637A, No Date.
English Abstract of Foreign Reference CN1989925A, No Date.
English Abstract of Foreign Reference CN102043417A, No Date.
English Abstract of Foreign Reference CN102047540A, No Date.
As-filed PCT Request of PCT/CN2019/109900, No Date.
As-filed PCT Application of PCT/CN2019/109900, No Date.
International Searching Authority (ISA) Form 210—International Search Report of PCT/CN2019/109900, No Date.
International Searching Authority (ISA) Form 237—Written Opinion of PCT/CN2019/109900, No Date.
Notification of the International Application number and of the International Filing Date—Form 105 of PCT/CN2019/109900, No Date.
PCT/ISA/202 Notification of Receipt of Search Copy of PCT/CN2019/109900, No Date.
PCT/ISA/220 of PCT/CN2019/109900, No Date.

\* cited by examiner

VOLTAGE BOOSTER CIRCUIT AND RELATED CIRCUIT, CHIP AND WEARABLE DEVICE

CROSS REFERENCE TO RELATED APPLICATIONS

The present disclosure is a continuation of international application No. PCT/CN2019/109900, filed on Oct. 08, 2019, which is hereby incorporated by reference in its entirety.

TECHNICAL FIELD

The present application relates to a power supply technology; in particular, to a voltage booster circuit and a related circuit, chip and wearable device.

BACKGROUND

With the development and advancement of technology, mobile electronic devices such as mobile phones, digital cameras, tablet computers, and notebook computers have become indispensable tools in people's lives. These electronic devices usually provide a supply voltage through a battery of the electronic device or an external power source of the electronic device. In some applications, the internal circuit of the electronic device requires an operating voltage higher than the supply voltage. Therefore, the supply voltage needs to be boosted by a voltage booster circuit. The characteristics of the voltage output by the existing voltage booster circuit are poor, which further jeopardizes the performance of the internal circuit, In order for the internal circuit to exhibit its desired performance, how to improve the characteristics of the voltage output by the voltage booster circuit has become an important task.

SUMMARY OF THE INVENTION

One purpose of the present application is to disclose a power supply technology; in particular, a voltage booster circuit and a related circuit, chip and wearable device, to address the above-mentioned issues.

One embodiment of the present application discloses a voltage booster circuit. The voltage booster circuit has an output terminal, wherein the output terminal is configured to provide an output voltage and a load current to a high-voltage circuit external to the voltage booster circuit. The voltage booster circuit comprises: a first charge pump, which is configured to provide a first bias current; a second charge pump, which is configured to provide the load current; an output voltage fixing circuit, which is coupled between the first charge pump and the output terminal of the voltage booster circuit and is configured to draw the first bias current from the first charge pump to the output terminal of the voltage booster circuit, wherein the output voltage fixing circuit fixes a first charge pump voltage of the first charge pump by fixing the first bias current and further fixes the output voltage of the output terminal of the voltage booster circuit based on the fixed first charge pump voltage; and a load current generation circuit, which is coupled between the second charge pump and the output terminal of the voltage booster circuit and configured to draw the load current from the second charge pump to the output terminal of the voltage booster circuit based on a second charge pump voltage of the second charge pump.

One embodiment of the present application discloses a circuit. The circuit comprises the above-mentioned voltage booster circuit and the high-voltage circuit.

One embodiment of the present application discloses a chip. The chip comprises the above-mentioned circuit.

One embodiment of the present application discloses a wearable device. The wearable device comprises the above-mentioned chip.

The voltage booster circuit disclosed in the present application comprises two charge pumps, the first charge pump and second charge pump. These two charge pumps are responsible for the output voltage and the load current, respectively. In short, the output voltage and the load current are not provided by the same charge pump; hence, the output voltage would not be interfered by the load current, and therefore, the output voltage has better characteristics.

DETAILED DESCRIPTION

Figure 1:
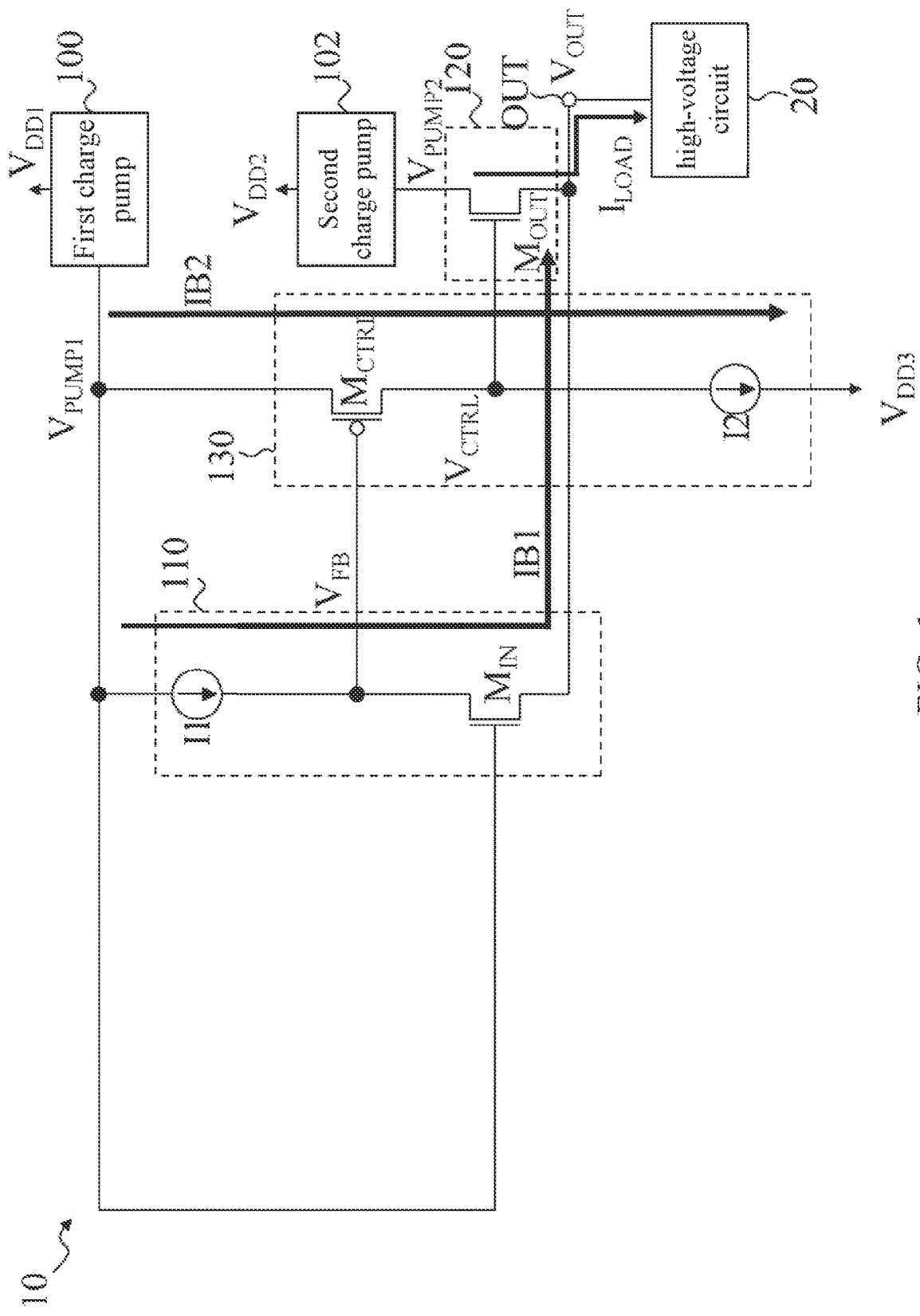
FIG. 1 is a circuit diagram of a voltage booster circuit according to the first embodiment of the present application.

The following disclosure provides many different embodiments, or examples, for implementing different features of the invention. Specific examples of components and arrangements are described below to simplify the present disclosure. As could be appreciated, these are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath, " "below, " "lower, " "above," "upper, " and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed considering the number of reported significant digits and by applying ordinary rounding techniques. Ranges can be expressed herein as from one endpoint to another endpoint or between two endpoints. All ranges disclosed herein are inclusive of the endpoints unless specified otherwise.

Both the value of the output voltage of the charge pump and the value of the ripple voltage of the output voltage are affected by the value of the output current (that is, the load current) of the charge pump. Generally, the load current makes the output voltage of the charge pump smaller and the ripple voltage of the output voltage greater, specifically, the greater the load current is, the smaller the output voltage of the charge pump is and the greater the ripple voltage of the output voltage is. The voltage booster circuit disclosed in the present application includes two charge pumps, which are respectively responsible for the output voltage and the load current. In other words, the output voltage and load current are not provided by the same charge pump; therefore, the value of the output voltage and the value of the ripple voltage of the output voltage will not be affected by the value of the load current. The details are described below.

FIG. 1 is a circuit diagram of a voltage booster circuit 10 according to the first embodiment of the present application. Referring to FIG. 1, the voltage booster circuit 10 has an output terminal OUT. The output terminal OUT is configured to provide an output voltage $V_{OUT}$ and a load current $I_{LOAD}$ to a high-voltage circuit 20 external to the voltage booster circuit 10. The output voltage $V_{OUT}$ is the supply voltage of the high-voltage circuit 20. In some embodiments, the high-voltage circuit 20 requires a voltage that is greater than the power voltage of the circuit system to serve as the supply voltage thereof. That is, the high-voltage circuit is a circuit that requires the power supply from the voltage outputted by the voltage booster circuit of the present application. For example, the high-voltage circuit 20 includes a rail-to-rail input amplifier. In this embodiment, the differential pair transistors of the rail-to-rail input amplifier receives the output voltage $V_{OUT}$ as the supply voltage of the differential pair transistors; since stable voltage and current are particularly required for the rail-to-rail input amplifier, the voltage booster circuit 10 of the present application therefore improves the performance of the rail-to-rail input amplifier, however, the high-voltage circuit 20 is not limited thereto. The voltage booster circuit 10 includes a first charge pump 100, a second charge pump 102, an output voltage fixing circuit 110, a load current generation circuit 120 and a control circuit 130.

The first charge pump 100 is coupled to the supply voltage $V_{DD\ 1}$ and provides the first charge pump voltage $V_{PUMP1}$ based on the supply voltage $V_{DD\ 1}$. Moreover, the first charge pump 100 provides a first bias current IB1 and a first bias current IB1. In other words, the first charge pump voltage $V_{PUMP1}$ is the output voltage of the first charge pump 100, whereas the sum of the first bias current IB1 and the second bias current IB2 is the output current of the first charge pump 100. In some embodiments, the values of the first bias current IB1 and the second bias current IB2 are 10 micro amperes (μA), respectively.

The second charge pump 102 is coupled to the supply voltage $V_{DD\ 2}$ and provides a second charge pump voltage $V_{PUMP2}$ based on the supply voltage $V_{DD\ 2}$. Moreover, the second charge pump 102 provides a load current $I_{LOAD}$. In other words, the second charge pump voltage $V_{PUMP2}$ is the output voltage of the second charge pump 102, whereas the load current $I_{LOAD}$ is the output current of the second charge pump 102. The value of the load current $I_{LOAD}$ is much greater than the output current of the first charge pump 100; in some embodiments, the value of load current $I_{LOAD}$ is 1 milliampere (mA). In some embodiments, the supply voltage $V_{DD\ 2}$ is the same as the supply voltage $V_{DD\ 1}$. In some embodiments, the supply voltage $V_{DD\ 2}$ may not be the same as the supply voltage $V_{DD\ 1}$.

The output voltage fixing circuit 110 is coupled between the first charge pump 100 and the output terminal OUT of the voltage booster circuit 10 and configured to draw the first bias current IB1 of a fixed value from the first charge pump 100 to the output terminal OUT of the voltage booster circuit 10 and generates an output voltage Your based on the first charge pump voltage $V_{PUMP1}$. On the other hand, the control circuit 130 is coupled to the first charge pump 100 and configured to draw the second bias current IB2 of a fixed value from the first charge pump 100. Since the voltage fixing circuit 110 fixes the first bias current IB1, and the control circuit 130 fixes the second bias current IB2, the first charge pump voltage $V_{PUMP1}$ of the first charge pump 100 can be fixed via the fixed the first bias current IB1 and the fixed second bias current IB2. Furthermore, the output voltage $V_{OUT}$ of the output terminal OUT of the voltage booster circuit 10 can also be fixed based on the fixed the first charge pump voltage $VP_{PUMP1}$, so as to reduce the ripple voltage of the output voltage $V_{OUT}$ as much as possible. Moreover, the output voltage fixing circuit 110 generates a feedback voltage $V_{FB}$ based on the output voltage $V_{OUT}$. When the level of the output voltage $V_{OUT}$ changes, the level of the feedback voltage $V_{FB}$ changes accordingly. In some embodiments, the second bias current IB2 is the same as the first bias current IB1. In some embodiments, the second bias current IB2 is different from the first bias current IB1.

In the present disclosure, the output current of the first charge pump 100 is the sum of the first bias current IM1 and the second bias current IB2 and thus does not include the load current $I_{LOAD}$ flowing into the high-voltage circuit 20. Therefore, the first charge pump voltage $V_{PUMP1}$ outputted by the first charge pump 100 will not be interfered by the load current $I_{LOAD}$ flowing into the high-voltage circuit 20. Also, the output voltage fixing circuit 110 generates the output voltage $V_{OUT}$ based on the first charge pump voltage $V_{PUMP1}$, and hence the output voltage $V_{OUT}$ will not be interfered. by the load current $I_{LOAD}$.

Moreover, the control circuit 130 is further coupled between the output voltage fixing circuit 110 and the load current generation circuit 120. The control circuit 130 generates a control voltage $V_{CTRL}$ based on the feedback voltage $V_{FB}$ to control the load current generation circuit 120. When the level of the output voltage $V_{OUT}$ changes under the influence of the ripple voltage, since the first bias current IB1 and the second bias current IB2 have a fixed value, the level of the feedback voltage $V_{FB}$ will change according to the output voltage $V_{OUT}$, and in turns, the level of the control voltage $V_{CTRL}$ changes accordingly, so as to reversely suppress the ripple voltage of the output voltage $V_{OUT}$.

The load current generation circuit 120 is coupled between the second charge pump 102 and the output terminal OUT of the voltage booster circuit 10 and configured to draw the load current $I_{LOAD}$ from the second charge pump 102 to the output terminal OUT of the voltage booster circuit 10 based on the second charge pump voltage $V_{PUMP2}$ of the second charge pump 102. It should be noted that although both the output voltage fixing circuit 110 and the load current generation circuit 120 are coupled to the high-voltage circuit 20, the value of the first bias current IB1 outputted by the output voltage fixing circuit 110 has been fixed, so the value of the load current $I_{LOAD}$ flowing into the high-voltage circuit 20 will not affect the value of the fixed first bias current IB1. In other words, the load current LOAD flowing into the high-voltage circuit 20 can be considered as being provided by the load current generation circuit 120, and the output voltage fixing circuit 110 does not participate in the supply of the load current $I_{LOAD}$. Also, although the second charge pump voltage $V_{PUMP2}$ is subject to the influence of the load current $I_{LOAD}$, the second charge pump voltage $V_{PUMP2}$ and the output voltage $V_{OUT}$ our are substantially unrelated; the output voltage $V_{OUT}$ has been fixed by the output voltage fixing circuit 110.

The load current generation circuit 120 is controlled by the control circuit 130. When the level of the output voltage $V_{OUT}$ changes due to the ripple voltage, the control circuit 130 controls the load current generation circuit 120 based on the output voltage $V_{OUT}$ to adjust the value of the load current $I_{LOAD}$. For example, when the level of the output voltage $V_{OUT}$ decreases, the control circuit 130 control load current generation circuit 120 based on the output voltage $V_{OUT}$ to draw more load current $I_{LOAD}$ from the second charge pump 102, so as to pull up the decreased level of the output voltage $V_{OUT}$.

Embodiments of the output voltage fixing circuit 110, the load current generation circuit 120 and the control circuit 130 are discussed below. However, the voltage fixing circuit 110, the load current generation circuit 120 and the control circuit 130 are not particularly limited to any of the following embodiments; rather, any circuit frameworks capable of implementing the above-mentioned functions of the voltage fixing circuit 110, the load current generation circuit 120 and the control circuit 130 fall within the scope of the present disclosure.

The output voltage fixing circuit 110 includes a first current source I1 and an input stage transistor $M_{IN}$. The first current source I1 is coupled to the first charge pump 100 and configured to draw the first bias current IB1 of the fixed value from the first charge pump 100. The input stage transistor $M_{IN}$ is serially connected between the first current source I1 and the output terminal OUT of the voltage booster circuit 10. and the gate of the input stage transistor $M_{IN}$ is coupled to the first charge pump 100. Since the first bias current IB1 of the fixed value flows through the input stage transistor $M_{IN}$, the gate-source voltage of the input stage transistor $M_{IN}$ is fixed based on the first bias current IB1 of the fixed value, according to the operation principle of transistors. in this way, when the level of the output voltage $V_{OUT}$ changes, the level of drain voltage of the input stage transistor $M_{IN}$ (as the feedback voltage $V_{FB}$) changes accordingly. Moreover, the output voltage $V_{OUT}$ can be expressed as the following equation (1):

$$V_{OUT} = V_G - V_{GS} \qquad (1),$$

wherein $V_G$ represents the gate voltage of the input stage transistor $M_{IN}$ (that is, the first charge pump voltage $V_{PUMP1}$), whereas $V_{GS}$ represents the gate-source voltage of the input stage transistor $M_{IN}$. In short, the output voltage $V_{OUT}$ of the output terminal OUT of the voltage booster circuit 10 is the voltage difference between the first charge pump voltage $V_{PUMP1}$ and the gate-source voltage $V_{GS}$ of the input stage transistor $M_{IN}$.

The control circuit 130 includes a control transistor $M_{CTRL}$ and a second current source I2. The gate of the control transistor $M_{CTRL}$ is coupled to the drain of the input stage transistor $M_{IN}$ of the output voltage fixing circuit 110, and the control transistor $M_{CTRL}$ is serially connected between the first charge pump 100 and the load current generation circuit 120. The second current source I2 receives a supply voltage $V_{DD\_3}$ and is configured to draw the second bias current IB2 of a fixed value front the first charge pump 100. Since the second bias current IB2 of the fixed value glows through the control transistor $M_{CTRL}$, the gate-source voltage of the control transistor $M_{CTRL}$ is fixed based on the second bias current IB2 of the fixed value, according to the operation principle of transistors.

In view of the foregoing, since the gate voltage $V_G$ of the input stage transistor $M_{IN}$ (that is, the first charge pump voltage $V_{PUMP1}$ has been fixed by the first current source I1 of the output voltage fixing circuit 110 and the second current source I2 of the control circuit 130, and since the gate-source voltage $V_{GS}$ of the input stage transistor $M_{IN}$ has been fixed by the first current source I1 of the output voltage fixing circuit 110, the output voltage $V_{OUT}$ is fixed in accordance with the above-mentioned equation (1) and is not related to the load current $I_{LOAD}$.

The load current generation circuit 120 includes an output stage transistor $M_{OUT}$, which is serially connected between the second charge pump 102 and the output terminal OUT of the voltage booster circuit 10. The value of the load current $I_{LOAD}$ that the output stage transistor $M_{OUT}$ draws from the second charge pump 102 depends on the value of the gate voltage of the output stage transistor $M_{OUT}$. In the present embodiment, when the gate-source voltage of the output stage transistor $M_{OUT}$ gets greater due to the increased gate voltage of the output stage transistor $M_{OUT}$, the conductivity of the output stage transistor $M_{OUT}$ is higher and therefore can draw more load current $I_{LOAD}$.

The gate voltage of the output stage transistor $M_{OUT}$ is fixed according to the first bias current IB1 and the second bias current IB2. Specifically, for example, when the level of the output voltage $V_{OUT}$ decreases, the source voltage of the input stage transistor $M_{IN}$ also deceases. Because the gate-source voltage $V_{GS}$ of the input stage transistor $M_{IN}$ is fixed by the first bias current IB1. the drain voltage of the input stage transistor $M_{IN}$ decreases according to the reduced input stage transistor $M_{IN}$. The drain voltage of the input stage transistor $M_{IN}$ is the gate voltage of the control transistor $M_{CTRL}$. Because the gate-source voltage of the control transistor $M_{CTRL}$ is fixed by the second bias current IB2, the drain voltage of the control transistor $M_{CTRL}$ increases according to the decreased gate voltage of the control transistor $M_{CTRL}$. The drain voltage of the control transistor $M_{CTRL}$ is the gate voltage of the output stage transistor $M_{OUT}$. The conductivity of the output stage transistor $M_{OUT}$ is higher according to the increased gate voltage of the output stage transistor $M_{OUT}$, so as to draw more load current $I_{LOAD}$ from the second charge pump 102, and hence the level of the output voltage $V_{OUT}$ increases.

Figure 2:
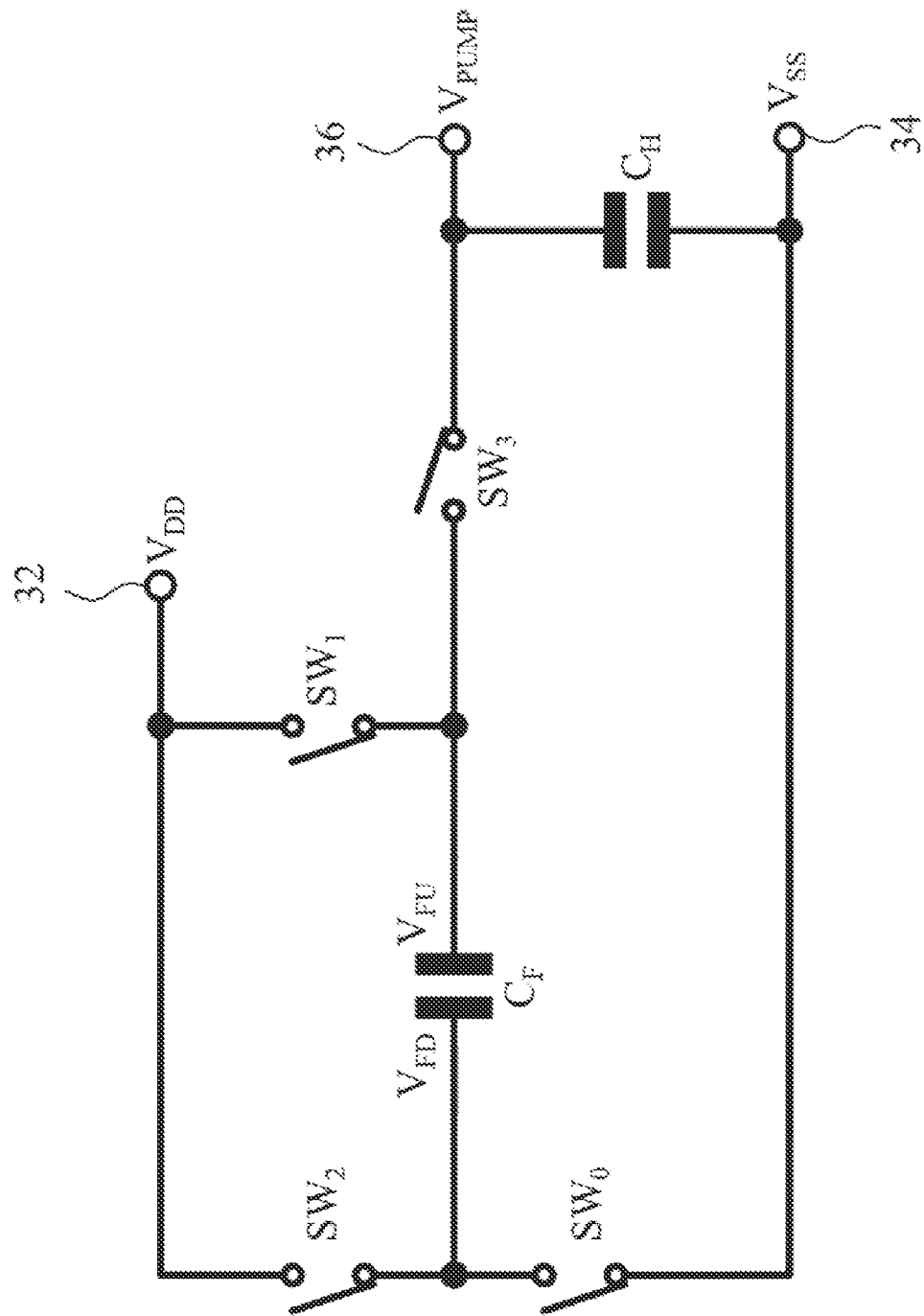
FIG. 2 is a circuit diagram of a charge pump according to an embodiment of the present application.

FIG. 2 is a circuit diagram of a charge pump 30 according to embodiments of the present application, wherein the first charge pump 100 and the second charge pump 102 shown in FIG. 1 can be implemented using the charge pump 30. Referring to FIG. 2, the charge pump 30 includes power source terminals 32 and 34, an output terminal 36, switches $SW_0$, $SW_1$, $SW_2$ and $SW_3$, and capacitors $C_F$ and $C_H$. The power source terminal 32 receives the supply voltage $V_{DD}$, the power source terminal 34 receives a reference ground voltage $V_{SS}$, and the output terminal 36 outputs a charge pump voltage $V_{PUMP}$.

When the first charge pump 100 is implemented as the charge pump 30, the power source terminal 32 receives the supply voltage $V_{DD\_1}$, the charge pump voltage $V_{PUMP}$ outputted by the output terminal 36 output is the first charge pump voltage $V_{PUMP1}$. When the second charge pump 102 is implemented as the charge pump 30], the power source terminal 32 receives the supply voltage $V_{DD\_2}$, the charge pump voltage $V_{PUMP}$ outputted by the output terminal 36 is the second charge pump voltage $V_{PUMP2}$.

During operation, switches $SW_0$ and $SW_1$ are conducted, and switches $SW_2$ and $SW_3$ are not conducted. The capacitor $C_F$ charges the supply voltage $V_{DD}$. In detail, the capacitor $C_F$ has the electrodes $V_{FD}$ and $V_{FU}$. The voltage of the electrode $V_{FD}$ is smaller than the voltage of the electrode $V_{FU}$, and the voltage difference therebetween is the supply voltage $V_{DD}$. Next, switches $SW_0$ and $SW_1$ are not conducted, and switches $SW_2$ and $SW_3$ are conducted. The voltage: level of the electrode $V_{FD}$ jumps from zero to the supply voltage $V_{DD}$; in this way, the voltage level of the electrode $V_{FU}$ jumps from the supply voltage $V_{DD}$ to twice the supply voltage $V_{DD}$. The charge pump voltage $V_{PUMP}$ of the output terminal 36 can be expressed as equation (2):

$$V_{PUMP} = 2 \times V_{DD} \quad (2)$$

In comparative embodiments, the charge pump 30 is used directly to provide the load current and the charge pump voltage $V_{PUMP}$ to the high-voltage circuit of the output terminal 36; such embodiments will face the following issues. Assuming that the capacitance of the capacitor $C_F$ is the same as the capacitance of the capacitor $C_H$, and both equals to the capacitance C. In this case, charge pump voltage $V_{PUMP}$ can be expressed as equation (3):

$$V_{PUMP} = 2 \times V_{DD} - \frac{I_O}{(F_S \times C)} \quad (3)$$

wherein, Fs represents the switching frequency of switches $SW_0$, $SW_1$, $SW_2$ and $SW_3$; and, $I_O$ represents the load current.

By comparing equations (2) and (3), it is found that when the load current to exists, the charge pump voltage $V_{PUMP}$ of the output terminal 36 is smaller compared to the charge pump voltage $V_{PUMP}$ without the load current $I_O$.

Moreover, the ripple voltage of the charge pump voltage $V_{PUMP}$ of the output terminal 36 can be expressed as equation (4):

$$V_{ripple} = \frac{I_O}{(2 \times F_S \times C)} \quad (4)$$

wherein $V_{ripple}$ represents the ripple voltage.

It can be seen from equation (4) that when the load current $I_O$ exists, the ripple voltage $V_{ripple}$ would be generated. Moreover, considering both equations (3) and (4), the load current $I_O$ would affect the charge pump voltage $V_{PUMP}$ and the ripple voltage $V_{ripple}$ at the same time. When the load current $I_O$ gets greater, the charge pump voltage $V_{PUMP}$ is smaller and the ripple voltage $V_{ripple}$ is greater; this means the distortion of charge pump voltage $V_{PUMP}$ of the charge pump 30 will get deteriorated. In this way, the high-voltage circuit cannot exhibit the normal performance and even becomes inoperable. In comparison, in the embodiment shown in FIG. 1, the first charge pump voltage $V_{PUMP1}$ is influenced by the first bias current IB1; however, since the first bias current IB1 is much smaller than the load current $I_O$, the first charge pump voltage $V_{PUMP1}$ shown in FIG. 1 will not get distorted as the charge pump voltage $V_{PUMP}$ does. To solve this issue, one can changes the switching frequency $F_S$ and the capacitance C according to equation (4). When the switching frequency $F_S$ increases, the distortion of the charge pump voltage $V_{PUMP}$ can be ameliorated, but it causes the increase in switching loss. When capacitance C increases, the distortion of the charge pump voltage $V_{PUMP}$ is also ameliorated, but it causes an increase in the layout area.

Referring back to FIG. 1, in the embodiment of FIG. 1, the charge pump 30 is not directly used to provide the load current and the charge pump voltage to the high-voltage circuit 20. In the embodiment of FIG. 1, the first charge pump 100 is used to provide the output voltage $V_{OUT}$ and the second charge pump 102 is used to provide the load current $I_{LOAD}$. Therefore, the value of the load current $I_{LOAD}$ do not affect the value of the output voltage $V_{OUT}$ and the value of the ripple voltage of the output voltage $V_{OUT}$. When the value of the charge pump voltage and the value of the ripple voltage of the charge pump voltage are given, the embodiment shown in FIG. 1 has a lower switching loss and a smaller layout area.

Figure 3:
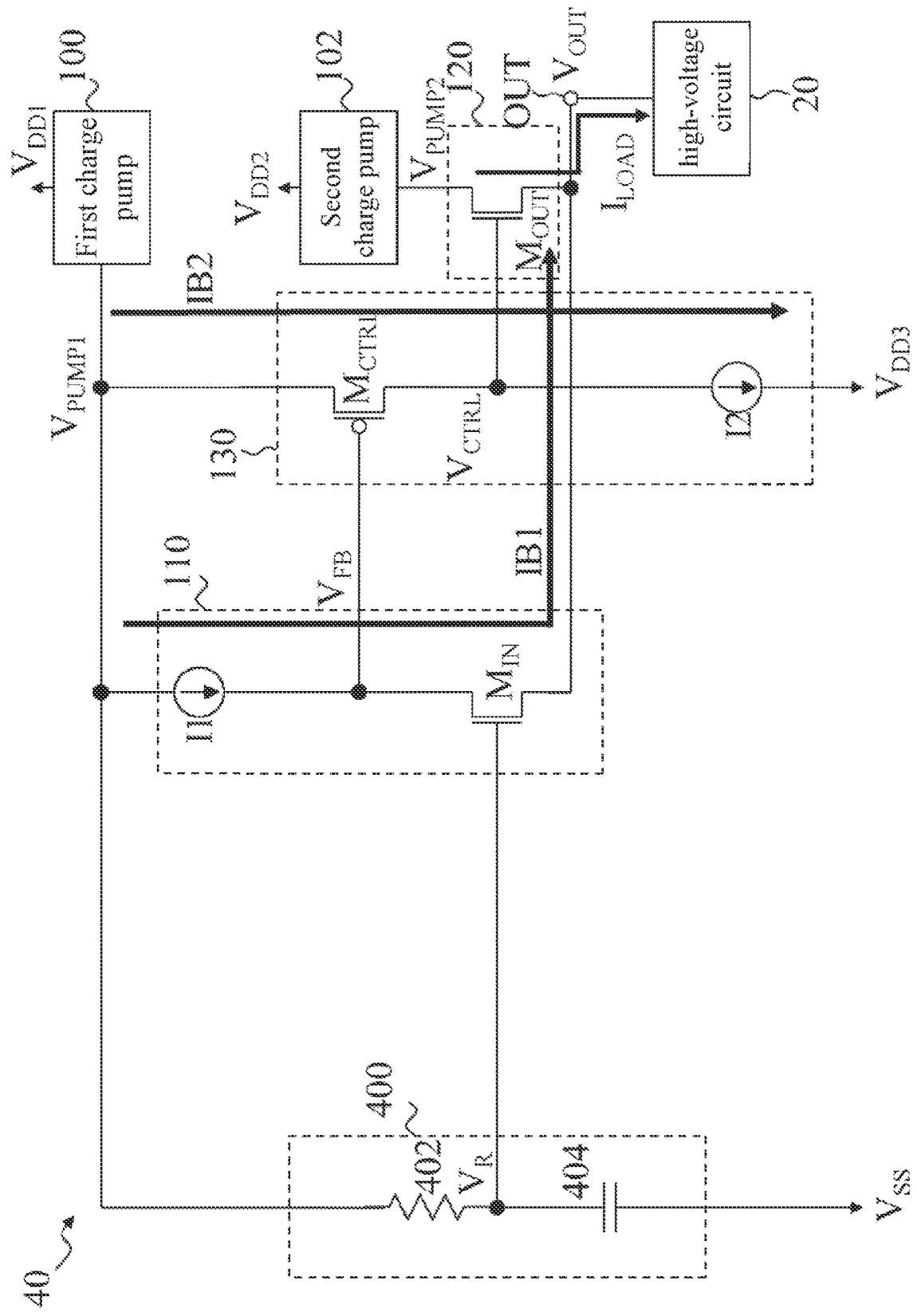
FIG. 3 is a circuit diagram of a voltage booster circuit according to the second embodiment of the present application.

FIG. 3 is a circuit diagram of a voltage booster circuit 40 according to the second embodiment of the present application. Referring to FIG. 3, the voltage booster circuit 40 is similar to the voltage booster circuit 10 shown in FIG. 1, except that the voltage booster circuit 40 further includes a low-pass filter 400. The low-pass filter 400 is coupled between the first charge pump 100 and the output voltage fixing circuit 110 and is configured to filter the first charge pump voltage $V_{PUMP1}$ so as to provide a filtered first charge pump voltage $V_R$ to the output voltage fixing circuit 110. The ripple voltage of the filtered first charge pump voltage $V_R$ is smaller than the ripple voltage of the first charge pump voltage $V_{PUMP1}$ as a result of the low-pass filter 400, so that the ripple voltage of the output voltage $V_{OUT}$ shown in FIG. 3 is smaller than the ripple voltage of the output voltage $V_{OUT}$ shown in FIG. 1. The low-pass filter 400 includes a resistor 402 and a capacitor 404 that are serially connected with respect to the first charge pump 100.

Figure 4:
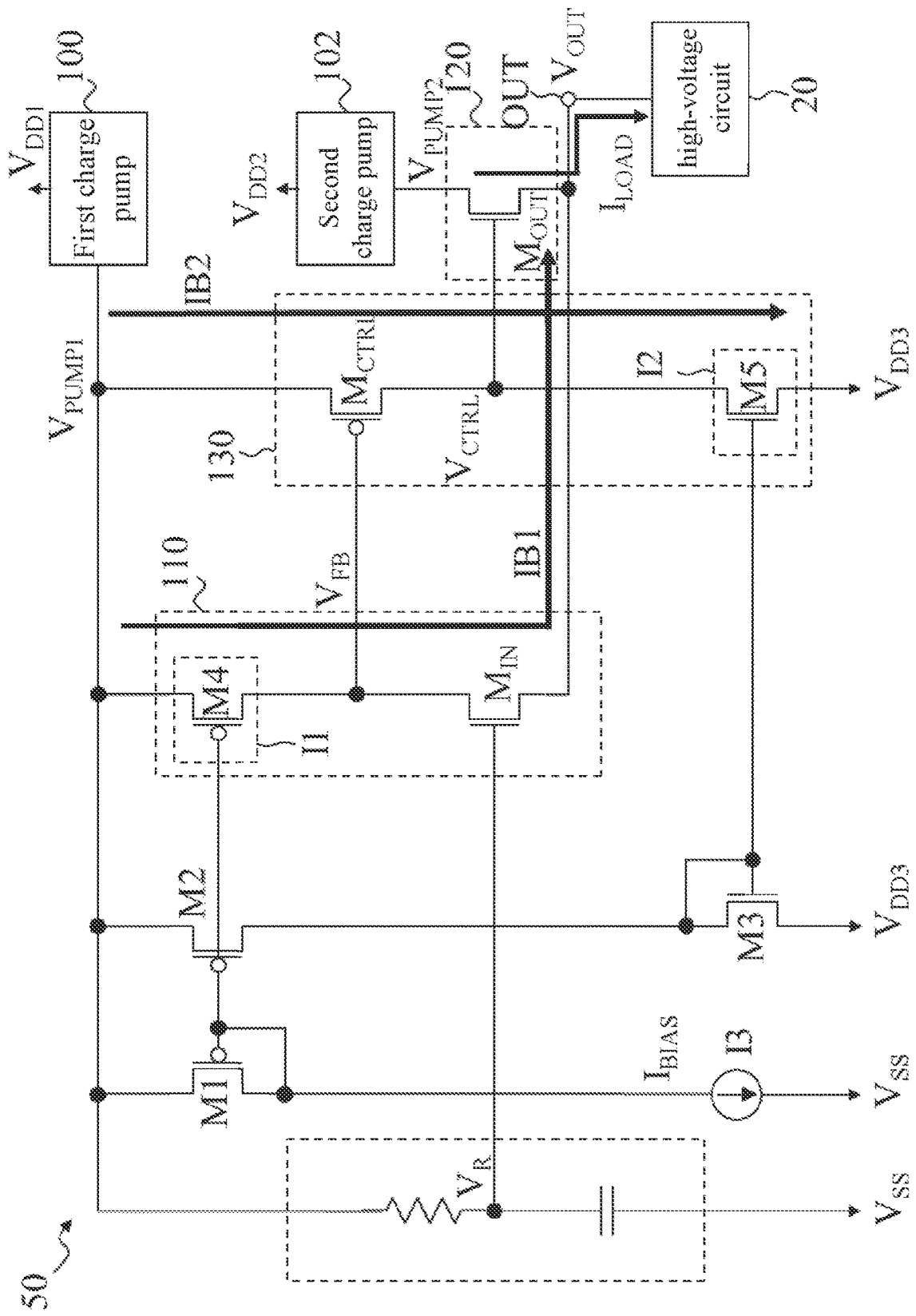
FIG. 4 is a circuit diagram of a voltage booster circuit according to the third embodiment of the present application.

FIG. 4 is a circuit diagram of a voltage booster circuit 50 according to the third embodiment of the present application. Referring to FIG. 4, the voltage booster circuit 50 is similar to the voltage booster circuit 40 shown in FIG. 4, except that the voltage booster circuit 50 includes a current source I3, transistors M1, M2, M3, M4 and M5, wherein the first current source I1 includes the transistor M4, and the second current source I2 includes the transistor M5.

The transistors M1 and M2 form the current mirror to replicate the bias current BIAS provided by the current source I3 that is serially connected with the transistor M1, so that the transistor M2 outputs the bias current $I_{BIAS}$ (that is, the first bias current IB1 is the bias current $I_{BIAS}$). Similarly, transistors M1 and M4 for the current mirror to replicate the bias current $I_{BIAS}$ provided by the current source I3 that is serially connected with the transistor M1, so that the transistor M4 outputs the bias current $I_{BIAS}$. Moreover, transistors M3 and M5 for the current mirror to replicate the bias current IBIAs outputted by the transistor M2, so that the transistor M5 outputs the bias current $I_{BIAS}$ (that is, the second bias current IB2 is the bias current $I_{BIAS}$).

Figure 5:
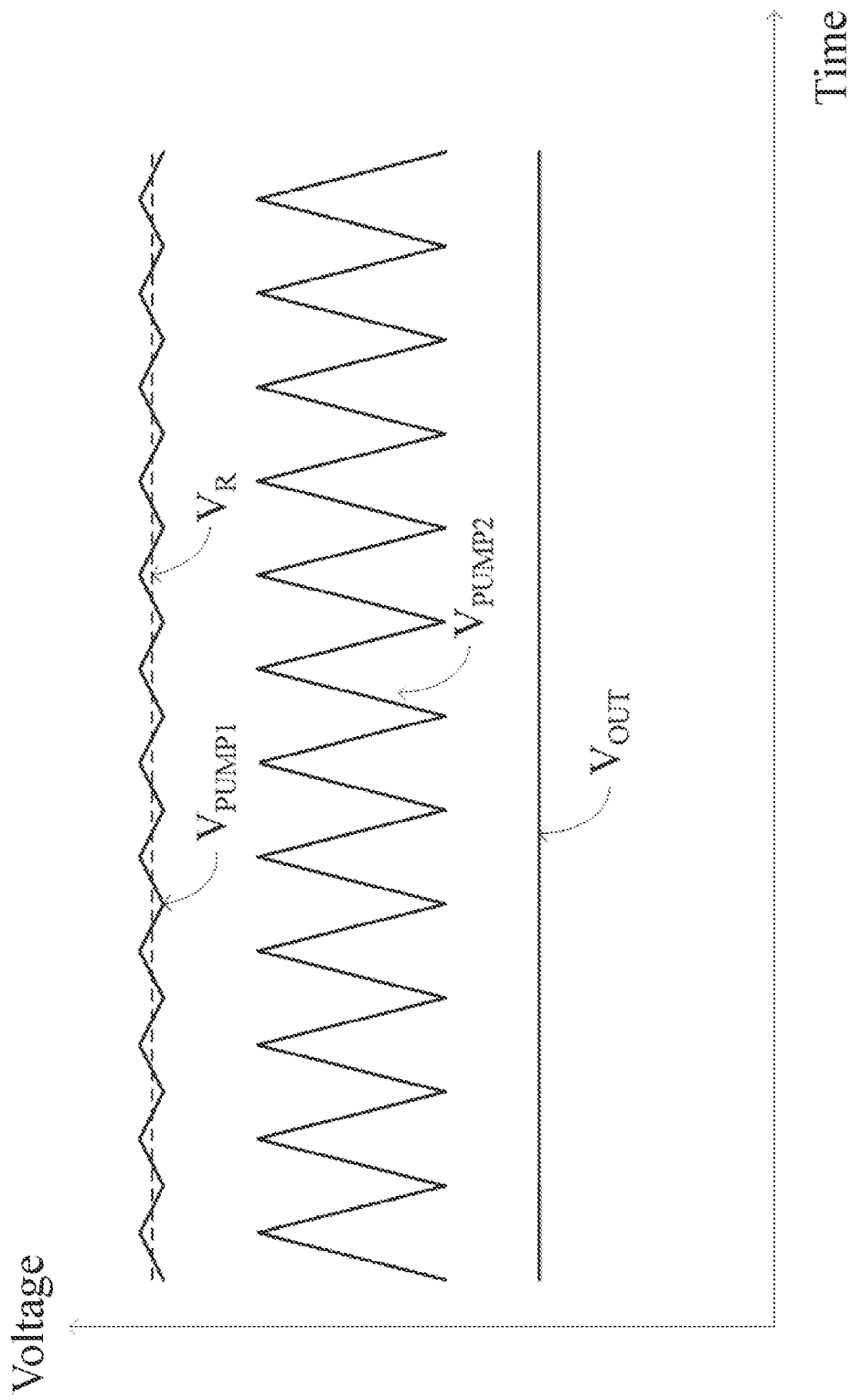
FIG. 5 is a waveform diagram of voltages of the voltage booster circuit shown in FIG. 4.

FIG. 5 is the waveform diagram of the voltage of the voltage booster circuit 50 shown in FIG. 4. Referring to FIG. 5, the horizontal axis represents time and the vertical axis represents voltage. As could be seen from FIG. 5, the first charge pump voltage $V_{PUMP1}$ is greater than the second charge pump voltage $V_{PUMP2}$, and the ripple voltage of the first charge pump $V_{PUMP1}$ is smaller than the ripple voltage of the second charge pump voltage $V_{PUMP2}$.

Moreover, after the filtering process by the low-pass filter 400, the ripple voltage of the filtered first charge pump voltage $V_R$ is smaller than the ripple voltage of the first charge pump voltage $V_{PUMP1}$, so that the ripple voltage of the output voltage $V_{OUT}$ is smaller than the ripple voltage of the second charge pump voltage $V_{PUMP2}$, wherein the ripple voltage of the second charge pump voltage $V_{PUMP2}$ is caused by the load current $I_{LOAD}$.

In some embodiments, a circuit includes the voltage booster circuit 10/40/50 and/or the high-voltage circuit 20. In some embodiments, a chip includes the voltage booster circuit 10/40/50 and/or the high-voltage circuit 20; for example, the chip can be a semiconductor chip implemented using various process.

Figure 6:
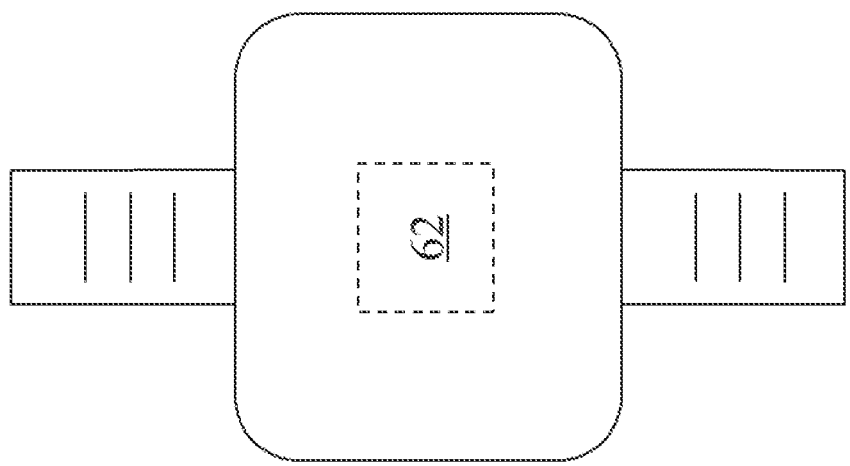
FIG. 6 is a schematic diagram illustrating the chip including the voltage booster circuit according to the present application applied in a wearable device.

FIG. 6 is a schematic diagram illustrating a chip 62 including the voltage booster circuit 10/40/50 of the embodiments of the present application wherein the chip 62 is applied in a wearable device 60. Referring to FIG. 6, the wearable device 60 includes the chip 62. The wearable device 60 can be, for example, a watch, necklace or any other smart wearable device.

The foregoing outlines the features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A voltage booster circuit, having an output terminal, wherein the output terminal is configured to provide an output voltage and a load current to a high-voltage circuit external to the voltage booster circuit, wherein the voltage booster circuit comprises:
   a first charge pump, configured to provide a first bias current;
   a second charge pump, configured to provide the load current;
   an output voltage fixing circuit, coupled between the first charge pump and the output terminal of the voltage booster circuit and configured to draw the first bias current from the first charge pump to the output terminal of the voltage booster circuit, wherein the output voltage fixing circuit fixes a first charge pump voltage of the first charge pump by fixing the first bias current, and further fixes the output voltage of the output terminal of the voltage booster circuit based on the fixed first charge pump voltage; and
   a load current generation circuit, coupled between the second charge pump and the output terminal of the voltage booster circuit and configured to draw the load current from the second charge pump to the output terminal of the voltage booster circuit based on a second charge pump voltage of the second charge pump.

2. The voltage booster circuit of claim 1, wherein the output voltage fixing circuit comprises:
   a first current source, coupled to the first charge pump and configured to draw the first bias current of a fixed value from the first charge pump.

3. The voltage booster circuit of claim 2, wherein the output voltage fixing circuit further comprises:
   an input stage transistor, coupled to the first current source, wherein a gate-source voltage of the input stage transistor is fixed based on the first bias current of the fixed value.

4. The voltage booster circuit of claim 3, wherein the input stage transistor is serially connected between the first current source and the output terminal of the voltage booster circuit, and a gate of the input stage transistor is coupled to the first charge pump.

5. The voltage booster circuit of claim 4, wherein the output voltage of the output terminal of the voltage booster circuit is a voltage difference between the first charge pump voltage and the gate-source voltage of the input stage transistor.

6. The voltage booster circuit of claim 1, wherein the load current generation circuit comprises:
   an output stage transistor, serially connected between the second charge pump and the output terminal of the voltage booster circuit.

7. The voltage booster circuit of claim 6, wherein a gate voltage of the output stage transistor is fixed at least based on the first bias current.

8. The voltage booster circuit of claim 1, wherein the voltage booster circuit further comprises:
   a control circuit, coupled between the output voltage fixing circuit and the load current generation circuit and configured to control the load current generation circuit based on the output voltage to adjust a value of the load current.

9. The voltage booster circuit of claim 8, wherein the control circuit further comprises:
   a second current source, configured to draw a second bias current of a fixed value from the first charge pump.

10. The voltage booster circuit of claim 9, wherein the control circuit comprises:
    a control transistor, wherein the gate-source voltage of the control transistor is fixed based on the second bias current of the fixed value.

11. The voltage booster circuit of claim 10, wherein the gate of the control transistor is coupled to the output voltage fixing circuit, and the control transistor is serially connected between the first charge pump and the load current generation circuit.

12. The voltage booster circuit of claim 1, further comprising:
    a low-pass filter, coupled between the first charge pump and the output voltage fixing circuit and configured to perform a filter process on the first charge pump voltage.

13. The voltage booster circuit of claim 1, wherein the first bias current is smaller than the load current.

14. A circuit, comprising:

a high-voltage circuit; and a voltage booster circuit having an output terminal, wherein the output terminal is configured to provide an output voltage and a load current to the high-voltage circuit external to the voltage booster circuit, wherein the voltage booster circuit comprises:

a first charge pump, configured to provide a first bias current;

a second charge pump, configured to provide the load current;

an output voltage fixing circuit, coupled between the first charge pump and the output terminal of the voltage booster circuit and configured to draw the first bias current from the first charge pump to the output terminal of the voltage booster circuit, wherein the output voltage fixing circuit fixes a first charge pump voltage of the first charge pump by fixing the first bias current, and further fixes the output voltage of the output terminal of the voltage booster circuit based on the fixed first charge pump voltage; and a load current generation circuit, coupled between the second charge pump and the output terminal of the voltage booster circuit and configured to draw the load current from the second charge pump to the output terminal of the voltage booster circuit based on a second charge pump voltage of the second charge pump.

15. The circuit of claim 14, wherein the high-voltage circuit comprises a rail-to-rail input amplifier.

16. A chip, comprising:

a circuit, including:

a high-voltage circuit; and a voltage booster circuit having an output terminal, wherein the output terminal is configured to provide an output voltage and a load current to the high-voltage circuit external to the voltage booster circuit, wherein the voltage booster circuit comprises:

a first charge pump, configured to provide a first bias current;

a second charge pump, configured to provide the load current;

an output voltage fixing circuit, coupled between the first charge pump and the output terminal of the voltage booster circuit and configured to draw the first bias current from the first charge pump to the output terminal of the voltage booster circuit, wherein the output voltage fixing circuit fixes a first charge pump voltage of the first charge pump by fixing the first bias current, and further fixes the output voltage of the output terminal of the voltage booster circuit based on the fixed first charge pump voltage; and a load current generation circuit, coupled between the second charge pump and the output terminal of the voltage booster circuit and configured to draw the load current from the second charge pump to the output terminal of the voltage booster circuit based on a second charge pump voltage of the second charge pump.

17. The chip of claim 16, wherein the high-voltage circuit comprises a rail-to-rail input amplifier.

18. A wearable device, comprising:

the chip of claim 16.

19. The wearable device of claim 18, wherein the high-voltage circuit comprises a rail-to-rail input amplifier.

* * * * *